Feb. 19, 1952
J. C. GRANFIELD
2,586,532
METHOD OF WORKING LAMINATED METAL
Filed Oct. 7, 1950
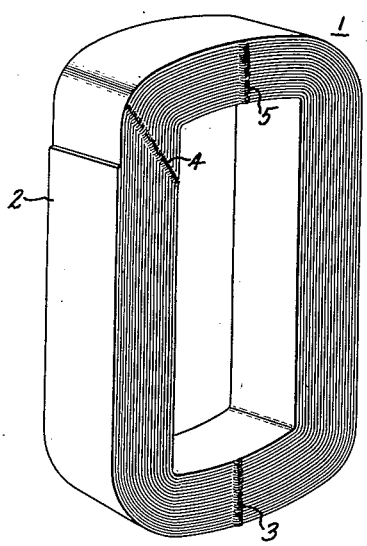
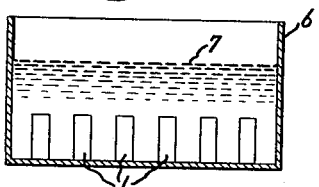
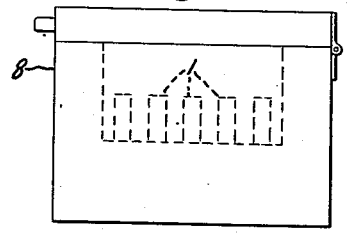
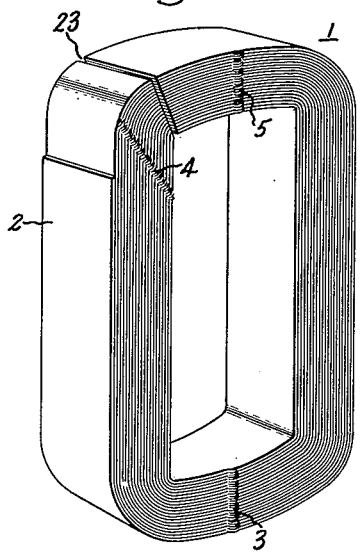
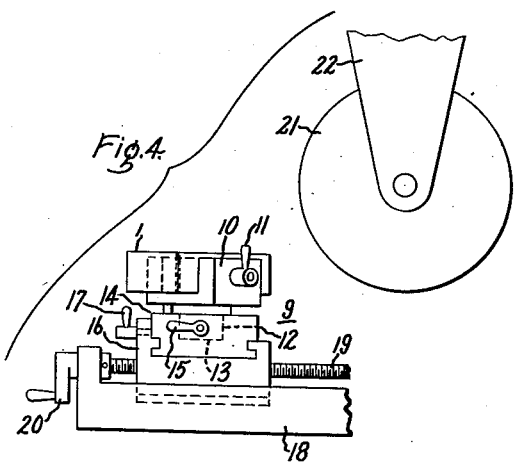
Inventor:
John C. Granfield,
by Ernest H. Britton
His Attorney.

Patented Feb. 19, 1952

2,586,532

UNITED STATES PATENT OFFICE 2,586,532

METHOD OF WORKING LAMINATED METAL

John C. Granfield, Pittsfield, Mass., assignor to General Electric Company, a corporation of New York Application October 7, 1950, Serial No. 188,997

6 Claims. (Cl. 51—281)

This invention relates to metal working and, more particularly, to a new and improved method of working laminated metal structures.

"Metal working" as herein used means cutting, drilling, slotting, machining, and any other similar operation. When a laminated metal structure at room temperature is worked crosswise of its laminations, the worked face contains a number of minute irregularities which spoil the mechanically smooth finish which is often desirable. This is particularly true when the laminations are made of comparatively soft metal and the working or cutting is done by a saw or a composition wheel. The reason is believed to be that the metal drags or flows and thus minute burrs are produced. In the case of laminated magnetic cores, to which the present invention is particularly directed, these burrs have the additional undesirable effect of impairing the magnetic properties of the core by bridging between adjacent laminations and thus effectively short circuiting them and greatly increasing the eddy current losses.

In accordance with the present invention, these undesirable effects are eliminated by lowering the temperature of the worked laminated metal structure substantially below room temperature prior to and during working it. It has been found that any reduction in temperature is beneficial and, within reasonable limits, the lower the temperature the greater the benefit. Also, the softer the metal, the lower the temperature necessary to get best results. For example, in the case of a transformer core having laminations of 12 or 14 mils thickness made of cold rolled oriented steel having 3 to 3½ per cent silicon, very satisfactory results have been obtained at a temperature of 40° below zero. This, incidentally, is the same temperature on both Fahrenheit and centigrade scales. The low temperature makes the metal more brittle so that it cuts or works more easily. Hence, not only is the temperature of the metal lower, but there is a lower temperature rise of the metal at the worked or cut face during working or cutting due to the fact that less local heat is developed due to the greater ease of working or cutting. The metal, therefore, does not flow or drag and form burrs.

In accordance with a supplemental feature of the present invention, the laminations are temporarily held together in a solid mass for the working or cutting operation by first soaking the laminated structure in any suitable liquid such as water so that the liquid will penetrate between the laminations. When the structure so treated subsequently has its temperature lowered well below the freezing point of water, the latter, of course, freezes solid and holds the structure rigidly together. The laminations may be permanently fastened together for subsequent use in any suitable manner.

An object of the invention is to provide a new and improved method of metal working.

Another object of the invention is to provide a new and improved method of working laminated structures.

A further object of the invention is to provide a new and improved method of cutting laminated transformer cores.

The invention will be better understood from the following description taken in connection with the accompanying drawing, and its scope will be pointed out in the appended claims.

In the drawing, Fig. 1 is a perspective view of a wound magnetic core for electric induction apparatus, such as transformers and reactors, whose lamination edges have been welded together preliminary to cutting by the present method; Fig. 2 is a sectional view of a tank in which cores such as shown in Fig. 1 may be soaked in carrying out the present method; Fig. 3 is a sectional view of a refrigerating compartment in which the soaked cores may be cooled to a relatively low temperature; Fig. 4 is a view of a machine and fixture for cutting cores of the type shown in Figs. 1, 2 and 3; and Fig. 5 is a view similar to Fig. 1 of a core which has been cut in accordance with the present invention.

Referring now to the drawing, and more particularly to Fig. 1, there is shown therein a generally rectangular shaped core 1 which may have been formed, for example, by winding a strip of magnetic steel 2 many times around a rectangular mandrel. In order to hold the core laminations together, after it has been cut for the purpose of fitting a preformed coil on it, the edges of the laminations may be welded together as shown at 3, 4 and 5. Preferably, two of the welds, such as 4 and 5, are located on opposite sides of and relatively close to the place where the core is to be cut.

Fig. 2 shows a tank 6 partially filled with water 7 in which are soaking a plurality of the cores 1. Preferably, a small amount of any suitable rust inhibitor is added to the water 7.

After the cores have been soaked for a sufficient length of time in the tub 6 so that the spaces between their laminations have been permeated by the water 7, the cores 1 are placed in a refrigerated compartment 8, as shown in Fig. 3, whose temperature is maintained at a relatively low value such, for example, as 40° below zero, either centigrade or Fahrenheit.

After the cores 1 have been in the refrigerated compartment 8 long enough for the water in them to freeze solid and for the entire mass to attain a temperature substantially corresponding to that which is maintained within the refrigerated compartment, they are removed one at a time and placed in a suitable jig or fixture 9, as shown in Fig. 4. This comprises a clamp member 10 for receiving a core 1 and which, by means of a lever operated screw 11, can be tightened so as to hold the core 1 firmly. Clamp member 10 is rotatable about a vertical axis by means of a cylindrical projection 12 on its bottom surface which fits in a complementary opening 13 in a carriage member 14. A hand-operated screw 15 on the carriage 14 is provided for locking the clamp 10 in any angular position. The carriage 14, in turn, is slidable in a direction perpendicular to the plane of the paper in a frame 16 and may be locked in any transverse position by means of another hand screw 17 in the frame 16. The frame 16 is mounted on a bed or main frame 18 and is threadedly engaged by a screw 19 having a crank 20 for operating it. In this manner, rotation of the crank 20 will move the frame 16 horizontally in the plane of the drawing. A saw in the form of a high speed composition or abrasive wheel 21, mounted in a support 22 and rotated by any suitable means (not shown), is provided. By means of the above-described adjustments on the fixture 9, the core 1 may be firmly clamped and oriented in any suitable position relative to the cutting wheel 21 and may then be moved into contact with the wheel 21 so as to be cut through.

The cut core is shown in Fig. 5 with the cut indicated at 23. This is shown at one of the corners of the core. It has been found that cores cut in accordance with this invention have very smooth cut faces without a trace of burrs, and no further treatment or working of the faces is necessary and these cut faces may be brought directly together so as to form a low loss, low reluctance butt joint.

In practice, after the core returns to room temperature and the water in it has melted, the faces of the cut 23 are separated by flexing or hinging the core and a preformed winding or windings are then slipped over the core after which the faces of the cut 23 are brought together and held in close contact in any well-known manner.

It should be understood that my invention, in its broader aspects, is not limited to the use of frozen liquid or ice for holding the laminations together during the cold working, and that a varnish or other suitable binder such as an inorganic coating on the laminations, which would bond them together during an annealing operation, could be used for this purpose. Also, the bonded cold core may be cut in two or more places so as to divide it into two or more parts.

While there has been shown and described a particular embodiment of the invention, it will be obvious to those skilled in the art that changes and modifications may be made without departing from the invention and, therefore, I aim in the appended claims to cover all such changes and modifications as fall within the true spirit and scope of my invention.

What I claim as new and desire to secure by Letters Patent of the United States is:

1. The method of cutting a laminated steel structure transverse to the laminations which comprises, lowering the temperature of said structure substantially below zero degrees F. so as to embrittle the steel, holding said laminations rigidly together, and cutting across said laminations while said structure is at said low temperature by conventional cutting means, said low temperature embrittled steel being cut without flowing or dragging so that burrs are not formed between laminations.

2. The method of cutting through a closed laminated transformer core of wound cold rolled grain oriented 3% to 3½% silicon alloy steel strip of 12 to 14 mils thickness which comprises, lowering the temperature of said core to substantially 40° below zero with its laminations firmly bonded together, and cutting through said bonded core while it is substantially at said low temperature so as to prevent the formation of burrs between laminations.

3. The method of working a laminated metal structure which comprises, inserting a freezable liquid between the laminations of said structure, lowering its temperature substantially below the freezing point of said liquid, and working said structure while the liquid therein is solidly frozen.

4. The method of working a laminated metal structure which comprises, soaking it in water, lowering its temperature substantially below the freezing temperature of water, and working a face on the structure crosswise of its laminations while the water between its laminations is frozen solid.

5. The method of cutting a closed multi-radial layer wound transformer core which comprises, soaking said core in water so that water penetrates between its layers, freezing the water between said layers solid, and cutting through said core while said water between said layers is frozen solid.

6. The method of cutting through a closed transformer core which is composed of a strip of cold rolled oriented 3% to 3½% silicon alloy steel of 12 to 14 mils thickness wound flatwise into a plurality of layers which comprises, soaking said core in water provided with a rust inhibitor so that water penetrates between its layers, lowering the temperature of said water-soaked core to substantially 40° below zero, and cutting through said core with a cutting wheel while it is substantially at said low temperature.

JOHN C. GRANFIELD.

REFERENCES CITED

The following references are of record in the file of this patent:

UNITED STATES PATENTS

| Number | Name | Date |
|---|---|---|
| 1,156,892 | Clement | Oct. 19, 1915 |
| 1,710,211 | Gammeter | Apr. 23, 1929 |
| 1,752,567 | McCullough | Apr. 1, 1930 |
| 2,203,937 | Barley | June 11, 1940 |
| 2,330,824 | Granfield | Oct. 5, 1943 |